Aug. 11, 1936.                F. J. WOLFF                2,050,407
                                SYRINGE
                          Filed April 4, 1935
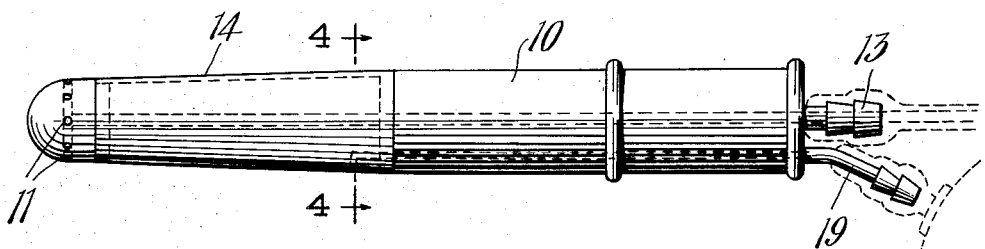
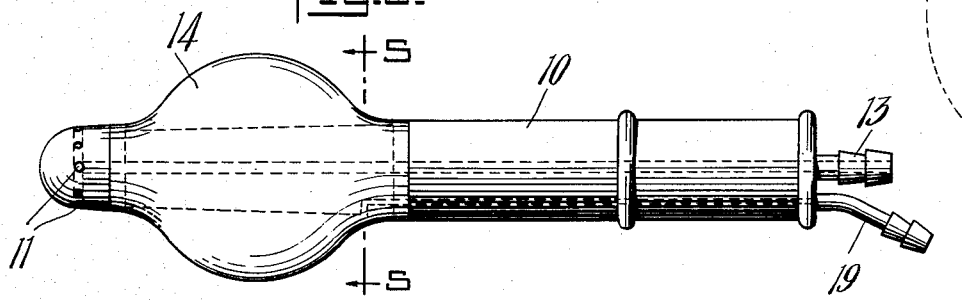
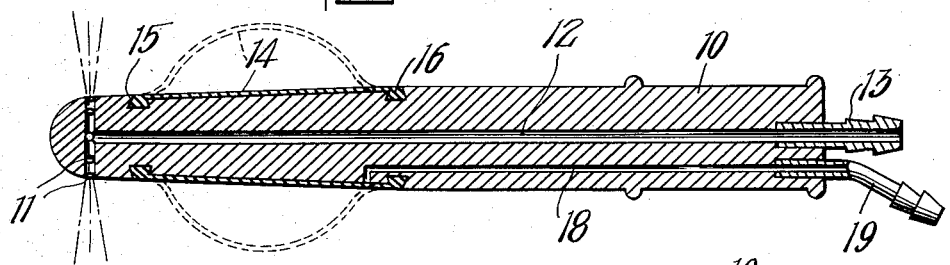
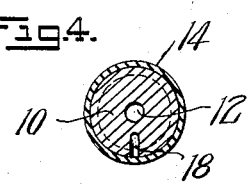
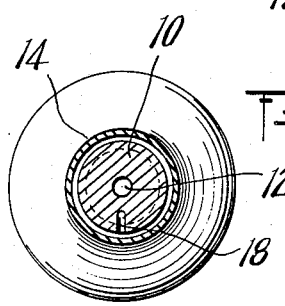
INVENTOR.
Franklyn J. Wolff
BY
Kenyon & Kenyon
ATTORNEYS Patented Aug. 11, 1936

2,050,407

UNITED STATES PATENT OFFICE 2,050,407

SYRINGE

Franklyn J. Wolff, Morrisville, Pa.

Application April 4, 1935, Serial No. 14,570

2 Claims. (Cl. 128—246)

This invention relates to syringes and has for an object a low liquid-pressure pneumatically dilated vaginal syringe which is of simple structure, is easy to operate and is highly efficient.

A device embodying the invention consists of a tubular member being closed at one end and provided with radial delivery ducts adjacent said end. Also, adjacent said closed end, an elastic inflatable jacket surrounds the tubular member and in the tubular member is provided a passageway through which air may be supplied to said jacket to inflate it.

With the jacket deflated, the tubular member is inserted and the jacket is inflated to dilate and also seal the vaginal canal. The space between the end of the canal and the surface of the jacket is now filled with flushing liquid supplied through the radial ducts in the inner end of the tubular member, which liquid may be supplied at very low pressure since it is not relied upon to dilate the canal. Then, by withdrawal movement of the tubular member, a partial vacuum is created in the space between the end of the canal and the jacket. Such vacuum will draw more flushing liquid into the canal to keep it full, thus insuring contact of the liquid with the entire surface of the canal wall and effecting thorough washing without use of high liquid pressure. On its withdrawal movement, the jacket will dilate the canal through its entire length to effect intimate contact of the liquid with the entire canal wall. The tubular member may be made of semi-hard rubber so that it is slightly flexible or may be made of hard rubber, metal or other stiff material, so that it is rigid.

Other objects, novel features and advantages of this invention will become apparent from the following specification and accompanying drawing, wherein:

Fig. 1 is a side elevation of a syringe embodying the invention;

Fig. 2 is a similar view showing the jacket inflated;

Fig. 3 is a central longitudinal section;

Fig. 4 is a section on the line 4—4 of Fig. 1;

Fig. 5 is a section on the line 5—5 of Fig. 2, and

Fig. 6 is a longitudinal section through the jacket.

A tubular member 10, preferably composed of semi-hard rubber is closed at one end and at such end is provided with a plurality of radially arranged ducts 11 communicating with the central duct 12. The central duct 12 terminates in a fitting 13 to which may be attached a rubber hose (not shown) by means of which liquid may be flowed through the bore 12 and out through the ducts 11.

Near its closed end, the member 10 is enclosed by a sleeve or jacket 14 composed of elastic material such as rubber or coagulated latex. Two peripheral grooves 15 and 16 are provided in the member 10 and are of dove-tail cross-section. The sleeve or jacket 14 consists of a thin walled central portion terminating at each end in an inwardly directed flange 17, which is originally made rectangular in cross-section as shown in Fig. 6. The flanges 17 are fitted into the grooves 15 and 16 and are firmly held in place by expansion of their inner ends into the enlarged portions of the grooves 15 and 16. The sleeve 14 is originally made of slightly less length than the distance between the grooves 15 and 16 so that when it is assembled with the tubular member 10, its cylindrical wall is under slight longitudinal tension. A passageway 18 is provided in the member 10 and has one end terminating at the surface of the member 10 between the grooves 15 and 16 and has its other end terminating in a fitting 19 to which may be attached a rubber tube leading from an air pressure bulb of any well-known type.

By pumping air through the passageway 18, the jacket or sleeve 14 may be dilated as shown in Figs. 2 and 3 to any required extent. With the device in position and the jacket 14 dilated, liquid may be introduced through the bore 12 and ducts 11 either by applying low pressure to the liquid or by reason of the suction effect previously referred to. By reason of the sleeve being mounted on the tubular member under slight tension, it will readily return to the position shown in full lines in Fig. 3 upon release of the air pressure.

It is thus apparent that the device as above described is highly efficient to accomplish the purpose for which it is designed and may easily be manipulated as its usage may require. It is to be understood that the tubular member may be made of any suitable material and that the jacket may be made of any elastic material.

I claim:

1. A vaginal syringe comprising an elongated cylindrical body having a single liquid channel extending longitudinally thereof and terminating in a series of radially arranged delivery passages, an elastic sleeve surrounding said body adjacent said delivery passages, said sleeve being set into said body to form a smooth continuous surface throughout the length of the body, and a duct in said body leading to said sleeve for supplying air to inflate said sleeve into sealing contact with the wall of the vaginal canal whereby withdrawal movement of the body and inflated sleeve produces a partial vacuum in said canal ahead of the inflated sleeve to draw liquid through said channel into the canal.

2. A vaginal syringe comprising an elongated cylindrical body having a single liquid channel extending longitudinally thereof and terminating in a series of radially arranged delivery passages, an elastic sleeve surrounding said body adjacent said delivery passages, said sleeve being set into said body to form a smooth continuous surface throughout the length of the body and having an inwardly directed flange at each end, said body having peripheral grooves in which said flanges are received, a duct in said body leading to said sleeve for supplying air to inflate said sleeve into sealing contact with the wall of the vaginal canal whereby withdrawal movement of the body and inflated sleeve produces a partial vacuum in said canal ahead of the inflated sleeve to draw liquid through said channel into the canal.

FRANKLYN J. WOLFF.